(12) United States Patent
Kim et al.

(10) Patent No.: US 7,072,513 B2
(45) Date of Patent: Jul. 4, 2006

(54) METHOD OF SEGMENTING HANDWRITTEN TOUCHING NUMERAL STRINGS HAVING NON-VERTICAL SEGMENTATION LINE

(75) Inventors: Kye Kyung Kim, Daegu (KR); Yun Koo Chung, Taejon (KR); Su Young Chi, Taejon (KR); Won Pil Yu, Ulsan (KR); Hyoung Gu Lee, Taejon (KR); Soo Hyun Cho, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 721 days.

(21) Appl. No.: 10/359,710

(22) Filed: Feb. 7, 2003

(65) Prior Publication Data

US 2004/0101197 A1    May 27, 2004

(30) Foreign Application Priority Data

Nov. 21, 2002    (KR) ...................... 10-2002-0072754

(51) Int. Cl.
*G06K 9/34*    (2006.01)
(52) U.S. Cl. ...................... 382/179; 382/178
(58) Field of Classification Search ................ 382/177, 382/178, 179, 200, 102
See application file for complete search history.

(56) References Cited

U.S. PATENT DOCUMENTS 5,321,768 A * 6/1994 Fenrich et al. ............. 382/178
6,643,401 B1 * 11/2003 Kashioka et al. ........... 382/197

FOREIGN PATENT DOCUMENTS

| KR | 97-49825 | 7/1997 |
|---|---|---|
| KR | 2001-83265 | 9/2001 |

OTHER PUBLICATIONS

Yi-Kai Chen, et al. ; Segmentation of Single- or Multiple-Touching Handwritten Numeral String Using Background and Foreground Analysis; IEEE Transactions On Pattern Analysis And Machine Intelligence; vol. 22, No. 11 ; Nov. 2000 ; pp. 1304-1317.

Xian Wang, et al. ; Holistic recognition of handwritten character pairs; Pattern Recognition 33 (2000) ; pp. 1967-1973.

* cited by examiner

*Primary Examiner*—Phuoc Tran
(74) *Attorney, Agent, or Firm*—Mayer, Brown, Rowe & Maw LLP

(57) ABSTRACT

Disclosed is a method of segmenting handwritten touching numeral strings having a non-vertical segmentation line. The method comprises the steps of: receiving an image of the handwritten touching numeral strings having the non-vertical segmentation line extracted from a specially patterned document; smoothing an uneven shape of the image of handwritten touching numeral strings; searching a contour line for the image of smoothed handwritten touching numeral strings; searching a candidate segmentation region, in which the touching numeral strings may exist, from the searched contour line; searching a candidate segmentation point within the candidate segmentation region; searching a vertical segmentation line for segmenting the handwritten touching numeral strings from the candidate segmentation point; searching the non-vertical segmentation line for segmenting the handwritten touching numeral strings having any inclination from the candidate segmentation lines; and segmenting the handwritten touching numeral strings by use of the vertical and non-vertical segmentation lines.

12 Claims, 9 Drawing Sheets

METHOD OF SEGMENTING HANDWRITTEN TOUCHING NUMERAL STRINGS HAVING NON-VERTICAL SEGMENTATION LINE

BACKGROUND OF THE INVENTION

1. Field of the Invention

The present invention relates to a character recognizing apparatus having a pattern recognizing function using an image processing technique, and more particularly, to a method of segmenting handwritten touching numeral strings having a non-vertical segmentation line.

2. Background of the Related Art

Recognition of handwritten numeral strings is one of pattern recognizing fields which have been most actively researched, because of having various application field such as zip codes recognition, check recognition, format document recognition or the like.

It is known that the process of recognizing the handwritten numeral strings containing touching numeral strings by use of a conventional character recognizing apparatus is difficult. The touching numeral strings may be classified into a first type of which a portion of numeral stroke is touched to neighboring numeral and a second type of which the neighboring numerals are touched by means of ligature.

In particular, the method of segmenting the touching numeral strings of the first type includes a recognition-based segmentation method in which candidate segmentation points are searched from a binary image or contour line of the touching numeral string and then in the results of recognizing the sub-image segmented by the candidate segmentation point the major candidate segmentation point is regarded as a final segmentation point, and another method of segmenting the touching numeral strings according to a segmentation rule independent upon the recognizing results. Since the former method may search the stable segmentation point in relative to the latter, it is widely used.

In addition, according to the methods of segmenting the numeral strings, the touching numeral string is segmented in a vertical direction by the searched candidate segmentation points. At that time, in case the touching numeral string having any inclination is segmented in the vertical direction by the candidate segmentation point, a portion of the numeral strokes may be lost. Therefore, the touching numeral string having any inclination provides more error results than the touching numeral string having no inclination.

Meanwhile, in order to solve the above problems, a method has been proposed in which after the inclination of the numeral string is compensated the numeral string is segmented and recognized. However, the inclination for the non-inclined numeral (i.e., numeral 4) may be evaluated, thereby obtaining erroneously compensated numeral images.

SUMMARY OF THE INVENTION

Accordingly, the present invention is directed to a method of segmenting handwritten touching numeral strings having a non-vertical segmentation line that substantially obviates one or more problems due to limitations and disadvantages of the related art.

An object of the present invention is to segment and recognize handwritten touching numeral strings having any inclination, without losing numeral stroke, by search a non-vertical segmentation line and segmenting the touching numeral strings.

To achieve the object and other advantages, according to one aspect of the present invention, there is provided a method of segmenting handwritten touching numeral strings having a non-vertical segmentation line, the method comprising the steps of: receiving an image of the handwritten touching numeral strings having the non-vertical segmentation line extracted from a specially patterned document; smoothing an uneven shape of the image of handwritten touching numeral strings; searching a contour line for the image of smoothed handwritten touching numeral strings; searching a candidate segmentation region, in which the touching numeral strings may exist, from the searched contour line; searching a candidate segmentation point within the candidate segmentation region; searching a vertical segmentation line for segmenting the handwritten touching numeral strings from the candidate segmentation point; searching the non-vertical segmentation line for segmenting the handwritten touching numeral strings having any inclination from the candidate segmentation lines; and segmenting the handwritten touching numeral strings by use of the vertical and non-vertical segmentation lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

Figure 2:
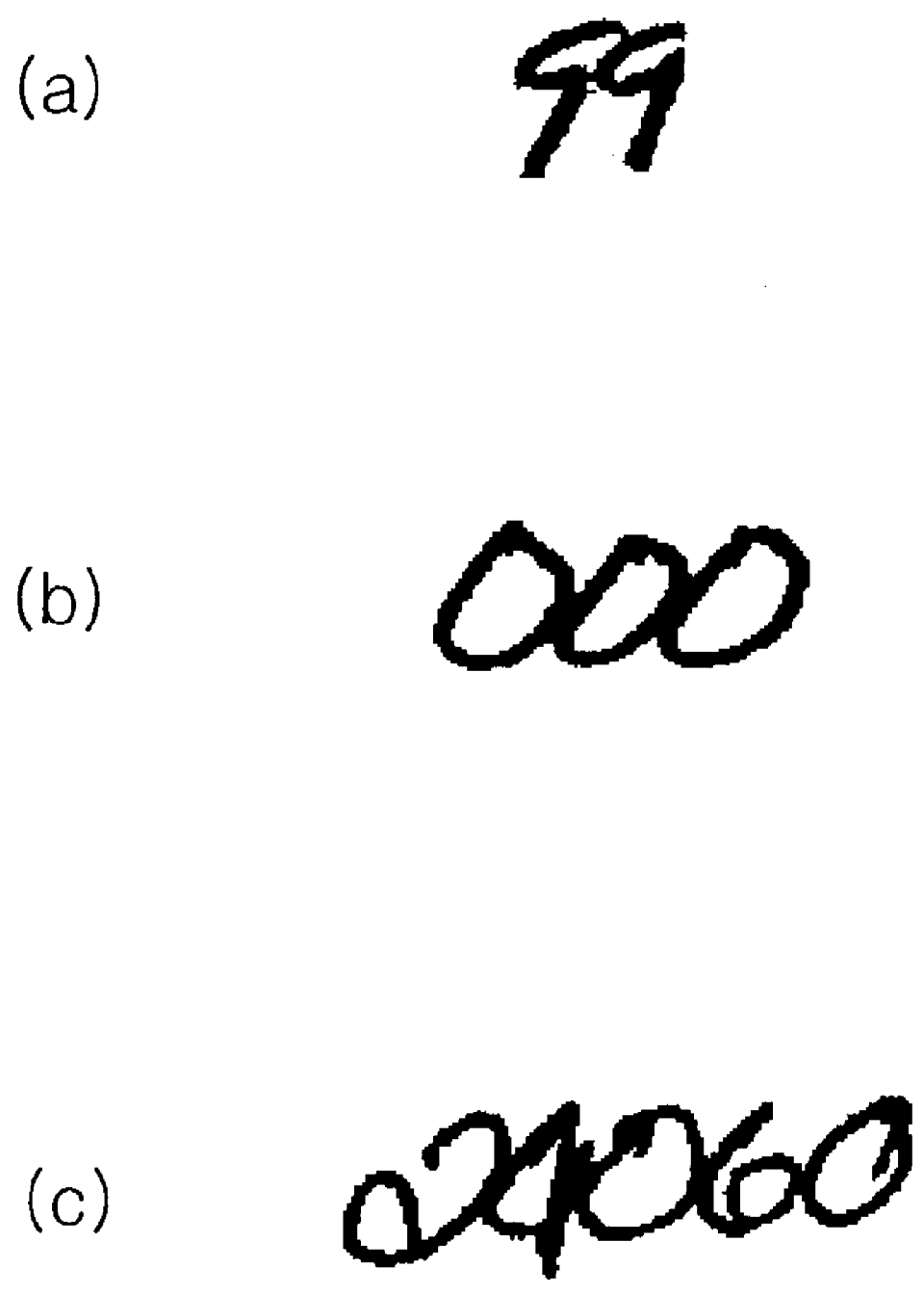

FIGS. 2a to 2c show samples of handwritten touching numeral strings having a non-vertical segmentation line;

Figure 9:
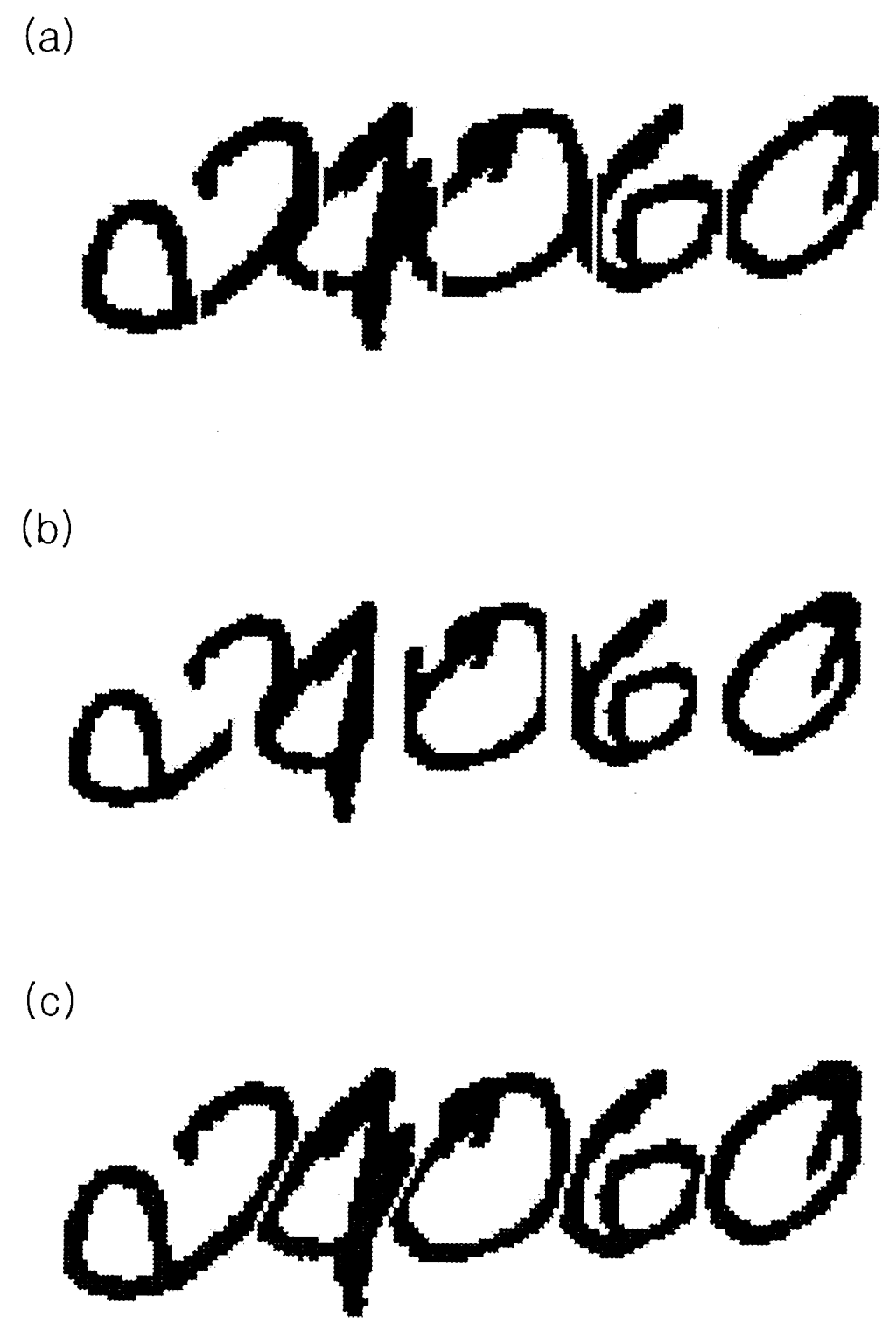

FIGS. 9a to 9c are views showing a handwritten touching numeral string segmented by vertical and non-vertical segmentation lines.

DETAILED DESCRIPTION OF THE PREFERRED EMBODIMENTS

A method of segmenting handwritten touching numeral strings having a non-vertical segmentation line according to one preferred embodiment of the present invention will now be explained with reference to the accompanying drawings.

Referring to FIGS. 1 to 9c, the character recognizing apparatus employing a method of segmenting numeral strings according to the present invention is inputted with an image of the handwritten touching numeral strings having the non-vertical segmentation line extracted from a specially patterned document (step S1).

At that time, the character recognizing apparatus extracts the handwritten touching numeral strings having the non-vertical segmentation line from the specially patterned document by use of samples of handwritten touching numeral strings extracted from an SD19 database of U.S. National Institute of Standards and Technology (NIST), for example, samples shown in FIGS. 2a to 2c, in order to obtain various types of handwritten touching numeral strings.

As shown in FIGS. 2a to 2c, the images of the handwritten touching numeral strings utilized in the simulation of the present invention are obtained under an environment which is not limited to handwriting equipments and handwritten area, and are extracted from a cursively patterned document.

Figure 1:
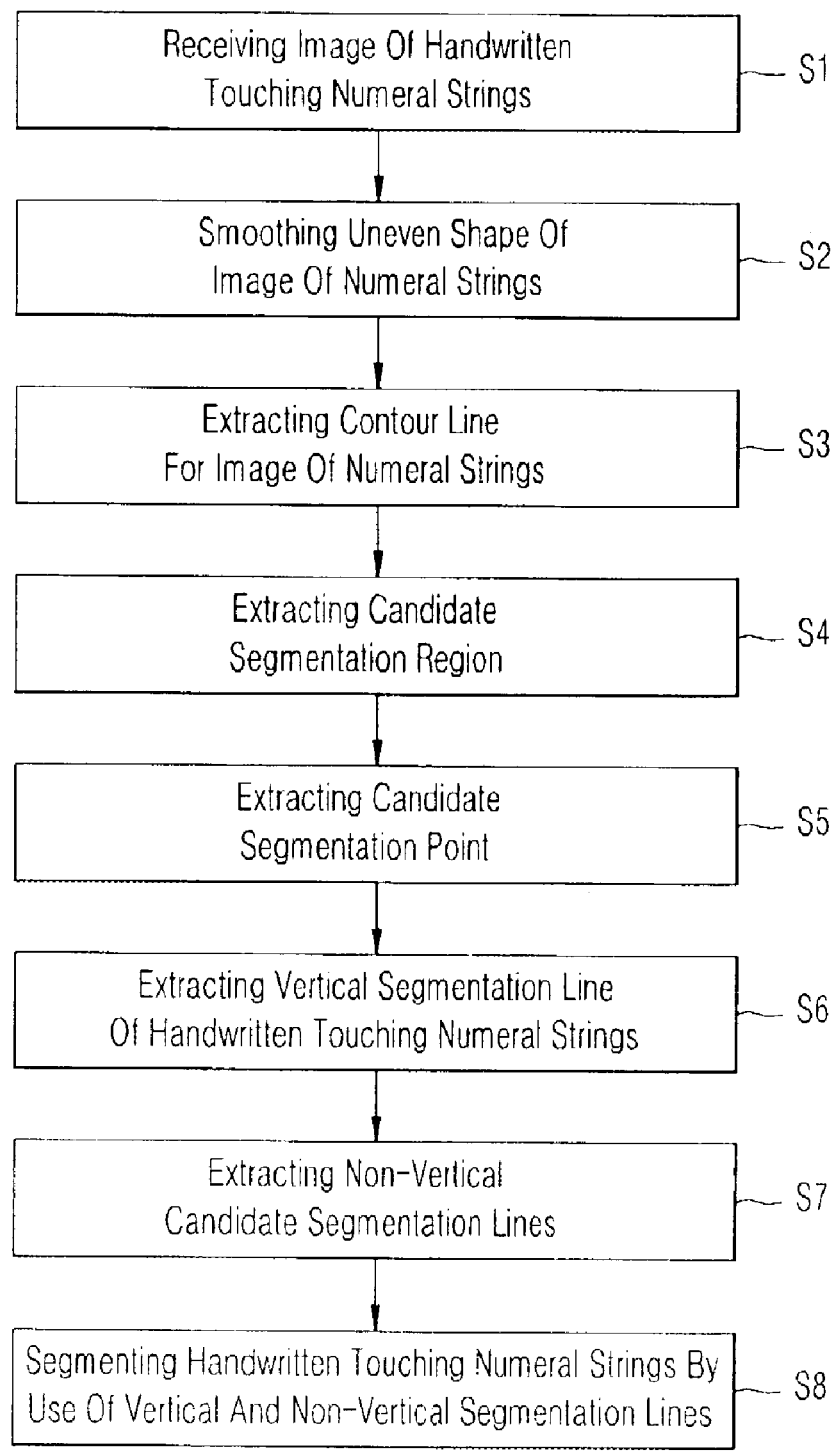
FIG. 1 is a flow chart of a method of segmenting handwritten touching numeral strings having a non-vertical segmentation line according to one preferred embodiment of the present invention.
Figure 3:
FIG. 3 is a view showing a contour line of a handwritten touching numeral string.
Figure 4:
FIGS. 4a to 4c show a candidate segmentation region, a valley region on a higher contour line, and a mountain region on a lower contour line.
Figure 4:
Figure 4:
Figure 5:
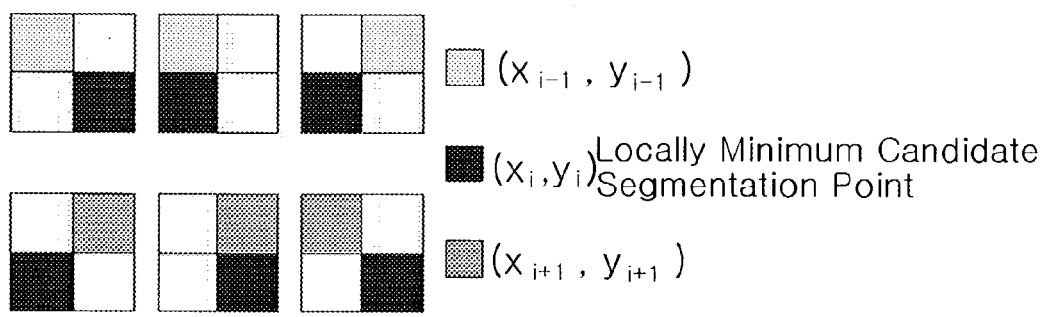
FIGS. 5a and 5b are views showing distribution of neighboring pixel of locally minimum and maximum candidate segmentation points.
Figure 5:
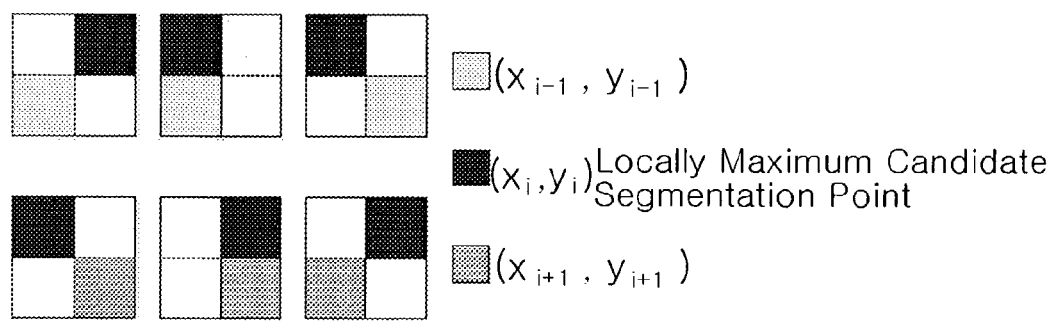
Figure 6:
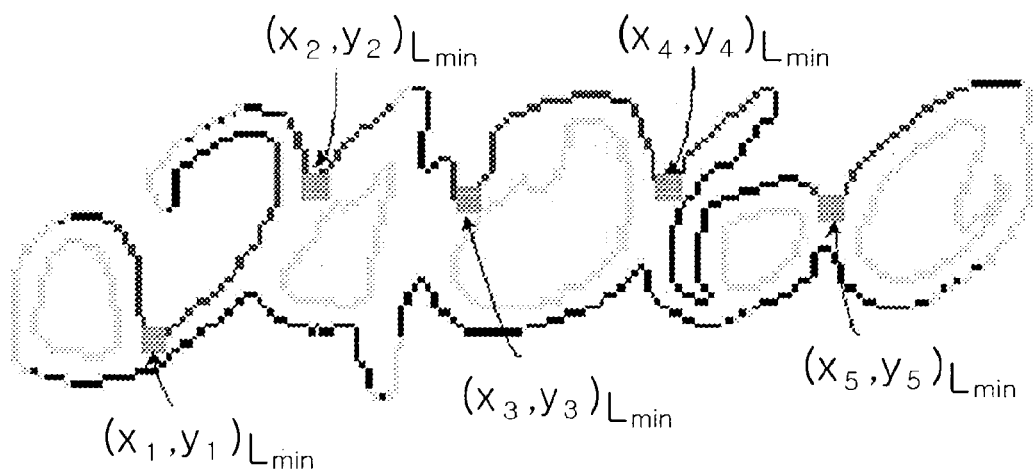
FIGS. 6a and 6b are views showing locally minimum candidate segment points searched in a valley region and locally maximum candidate segment points searched in a mountain region.
Figure 6:
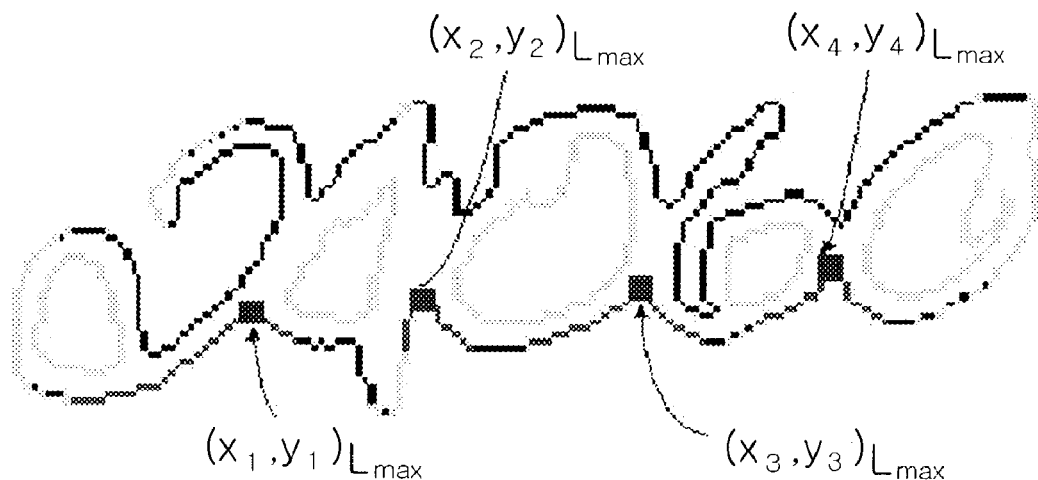
Figure 7:
FIGS. 7a and 7b are views showing a vertical segmentation line searched from locally minimum and maximum candidate segmentation points.
Figure 7:

If the images of handwritten touching numeral strings having the non-segmentation line, since a contour line of the numeral string image is bent in an uneven shape by a pen used at inputting the handwritten numeral strings or in a process of inputting the touching numeral strings, the character recognizing apparatus smoothes the uneven shape of the image of handwritten touching numeral strings prior to segmentation of the touching numeral strings (step S2). As shown in FIG. 3, the character recognizing apparatus searches the contour line for the image of smoothed handwritten touching numeral strings (step S3).

If the uneven shape of the image of handwritten touching numeral strings is smoothed prior to the segmentation of the touching numeral strings, the smoothed touching numeral strings contains less candidate segmentation points than non-smoothed touching numeral strings when searching the candidate segmentation points from the contour line by use of a component value of respective pixel directions at a candidate segmentation region in which the touching numeral strings may exist (steps S4 and S5), thereby improving the recognizing performance of the touching numeral strings and the accuracy of the segmentation.

After the contour line for the image of smoothed handwritten touching numeral strings is searched, the character recognizing apparatus searches the candidate segmentation region, (black contour line) in which the touching numeral strings may exist, from the searched contour line (step S4), as shown in FIG. 4a, and then searches the candidate segmentation point at the candidate segmentation region (step S5).

At that time, the character recognizing apparatus searches a valley region indicated by a red color which can search a local minimum candidate segmentation point from the higher contour line region, as shown in FIG. 4b, and then searches a mountain region indicated by a red color which can search a local maximum candidate segmentation point from the lower contour line region, as shown in FIG. 4c. For reference, FIG. 5a shows a direction distributing state of a neighboring pixel to obtain the local minimum candidate segmentation point in the valley region searched in FIG. 4b, and FIG. 5b shows a direction distributing state of a neighboring pixel to obtain the local maximum candidate segmentation point in the mountain region searched in FIG. 4c.

Actually, when the candidate segmentation region in which the touching numeral strings may exist is searched from the contour line, the character recognizing apparatus evaluates pixels (y-coordinate value $p_{up_i}$ for x-axis) having a maximum y-coordinate value on the same x-axis among the pixels for the higher contour line by use of the following equation 1, and then evaluates the remaining pixels $p1_{up_i}$ according to the following equation 2, the remaining pixels being made by removing pixels, which are firstly met when the x-coordinate value is increased relative to y-axis and when the x-coordinate value is decreased, among the evaluated y-coordinate values. Then, supposing that if the pixels satisfies the conditions shown in the following equation 3 and a chain direction value for the pixel has one value among (225°, 270°, 315°), the valley region is started, a valley region-start flag is set. And then, if a chain direction value for a next continuous pixel has one value among (45°, 90°, 135°), the pixel region is searched by a valley region $p11_{up_i}$ capable of segmenting the handwritten touching numeral strings.

$$p_{up_i} = \max_y \{(x_i, y_i) \in C_{up}\}, \quad i = 0, 1, 2, \ldots, x_n - 1 \qquad \text{Equation 1}$$

wherein, $C_{up}$ means a higher contour line, $(x_i, y_i)$ means a contour line pixel, and i means a width of x-axis.

$$p1_{up_i} = \\ \left\{ (x_i, y_i) \in p_{up_i} \middle| (x_i, y_i) \notin \min_x [(x_i, y_i) p_{up_i} | y] \wedge (x_i, y_i) \notin \max_x [(x_i, y_i) p_{up_i} | y] \right\}$$

Equation 2

$$(x_i, y_i) \in p1_{up_i} \qquad \text{Equation 3}$$

In addition, when the candidate segmentation region in which the touching numeral strings may exist is searched from the contour line, the character recognizing apparatus evaluates pixels (y-coordinate value $p_{dn_i}$ for x-axis) having a minimum y-coordinate value on the same x-axis among the pixels for the lower contour line by use of the following equation 4, and then evaluates the remaining pixels $p2_{dn_i}$ according to the following equation 5, the remaining pixels being made by removing pixels, which are firstly met when the x-coordinate value is increased relative to y-axis and when the x-coordinate value is decreased, among the evaluated y-coordinate values. Then, supposing that if the pixels satisfies the conditions shown in the following equation 6 and a chain direction value for the pixel has one value among (45°, 90°, 135°), the mountain region is started, a mountain region-start flag is set. And then, if a chain direction value for a next continuous pixel has one value among (225°, 270°, 315°), the pixel region is searched by a mountain region $p22_{dn_i}$ capable of segmenting the handwritten touching numeral strings.

$$p_{dn_i} = \min_y \{(x_i, y_i) \in C_{dn}\}, \quad i = 0, 1, 2, \ldots, x_n - 1 \qquad \text{Equation 4}$$

wherein, $C_{dn}$ means a lower contour line, $(x_i, y_i)$ means a contour line pixel, and i means a width of x-axis.

$$p2_{dn_i} = \{(x_i, y_i) \in p_{dn_i} | (x_i, y_i) \notin \min_x[(x_i, y_i)p_{dn_i}|y] \wedge (x_i, y_i) \notin \max_x[(x_i, y_i)p_{dn_i}|y]\}$$ Equation 5

$$(xi, yi) \epsilon p2_{dn_i}$$ Equation 6

If the mountain and valley regions are searched according to the equations 1 to 6, the character recognizing apparatus searches the local minimum candidate segmentation point in the valley region and the local maximum candidate segmentation point in the mountain region using the following equations 7 and 8, as shown in FIGS. 6a and 6b.

$$(x_i, y_i)_{L_{min}} = \{(x_i, y_i) \in p11_{up_i} \,|\,$$
$$[L((x_{i-1}, y_{i-1}(x_i, y_i)) = (225° \text{ or } 270° \text{ or } 315°)] \wedge$$
$$[L((x_i, y_i(x_{i+1}, y_{i+1})) = (45° \text{ or } 90° \text{ or } 135°)]\}$$ Equation 7

$$(x_i, y_i)_{L_{min}} = \{(x_i, y_i) \in p22_{dn_i} \,|\,$$
$$[L((x_{i-1}, y_{i-1}(x_i, y_i)) = (45° \text{ or } 90° \text{ or } 135°)] \wedge$$
$$[L((x_i, y_i(x_{i+1}, y_{i+1})) = (225° \text{ or } 270° \text{ or } 315°)]\}$$ Equation 8

In addition, pair of non-vertical (never) candidate segmentation points are searched from the local minimum and maximum candidate segmentation points evaluated as described above according to the following equation 9.

$$((x_i,y_i)_{L_{min}}(x_j,y_j)_{L_{max}})_{nver_k} = \{(x_i,y_i)\epsilon(x_i,y_i)_{L_{min}}\widehat{\,}(x_j,y_j)\epsilon(x_j,y_j)_{L_{max}}\}$$ Equation 9

$$i = 0, 1, \ldots, n_{1_{min}} - 1$$

$$j = 0, 1, \ldots, n_{1_{max}} - 1$$

$$k = 0, 1, \ldots, n_{1_{nver}} - 1$$

wherein, i, j and k mean respectively the local minimum candidate segmentation point, the local maximum candidate segmentation point, and the number of a pair of non-vertical candidate segmentation points, $(x_i, y_i)$ means an enter point of the non-vertical segmentation point, and $(x_j, y_j)$ means an exit point of the non-vertical segmentation point.

At that time, the pair of non-vertical candidate segmentation points $((x_i,y_i)_{L_{min}}(x_j,y_j)_{L_{max}})_{nver_k}$ is determined as a proper non-vertical candidate segmentation line, if it does not passed through a hole of the image of numerical string and satisfies the conditions of the following equations 10 and 11.

$$|(x_i,y_i)_{L_{min}}(x_j,y_j)_{L_{max}}| < 2 \times H_{digit}$$ Equation 10 wherein, $H_{digit}$ means a height of the image of numerical string.

$$y_i < y_j$$ Equation 11

After the candidate segmentation point is searched in the candidate segmentation region as described above, the character recognizing apparatus searches a vertical segmentation line for segmenting the handwritten touching numeral strings from the candidate segmentation point (step S6). At that time, among the searched candidate segmentation points, any point on the contour line mostly neighboring in a vertically lower direction is searched in the locally minimum candidate segmentation point to determine the candidate segmentation line, and any point on the contour line mostly neighboring in a vertically higher direction is searched in the locally maximum candidate segmentation point to determine the candidate segmentation line.

The vertical segmentation line shown in FIG. 7a is a line in which the locally minimum candidate segmentation point existed in the valley region is regarded as the enter point and the y-coordinate for the lower contour line having the same x-coordinate as the locally minimum candidate segmentation point is regarded as the exit point, and the vertical segmentation line shown in FIG. 7b is a line in which the locally maximum candidate segmentation point existed in the mountain region is regarded as the exit point and the y-coordinate for the higher contour line having the same x-coordinate as the locally maximum candidate segmentation point is regarded as the enter point.

After the vertical segmentation lines are searched as described above, the character recognizing apparatus searches the non-vertical segmentation line for segmenting the handwritten touching numeral strings having any inclination from the candidate segmentation lines (step S7). At that time, the apparatus constructs pairs of the locally minimum candidate segmentation points and the locally maximum candidate segmentation points from the searched candidate segmentation points, and adds the pairs of the non-vertical candidate segmentation points to evaluate the non-vertical segmentation line.

Figure 8:
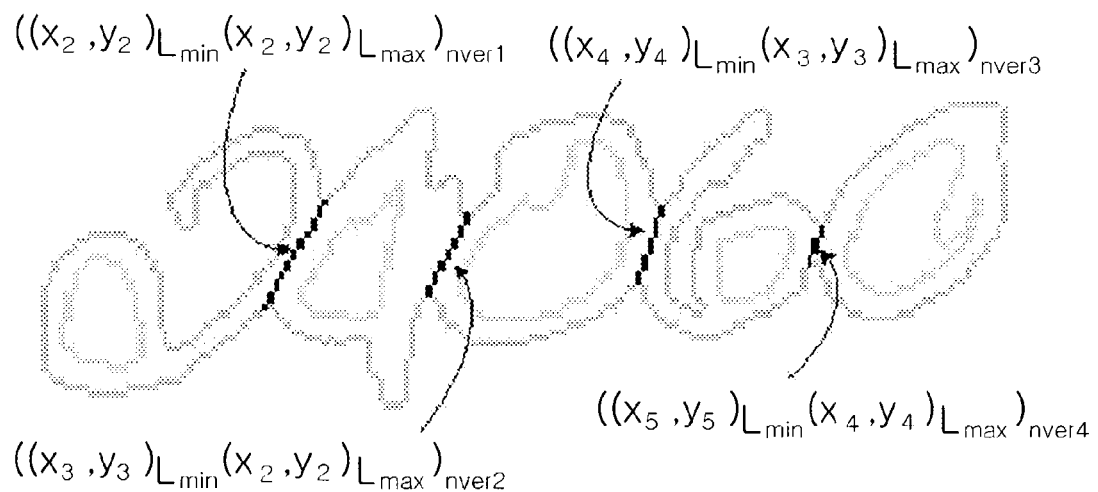
FIG. 8 is a view showing a pair of non-vertical candidate segmentation line searched from locally minimum and maximum candidate segmentation points.

The non-vertical candidate segmentation line shown in FIG. 8 is a line in which is evaluated by adding the pair of candidate segmentation points of which the locally minimum candidate segmentation point is regarded as the enter point and the locally maximum candidate segmentation point is regarded as the exit point.

After the vertical and non-vertical segmentation lines are searched as described above, the character recognizing apparatus segments the handwritten touching numeral strings by use of the vertical and non-vertical segmentation lines so as to recognize the numeral strings (step S8).

The character recognizing apparatus eliminates all of the candidate segmentation points of which a portion of strokes of numeral string image segmented by the searched candidate segmentation points is lost, and then segments the image from the leftmost numeral string image to the respective candidate segmentation points, thereby forming the sub-images as shown in FIGS. 9a to 9c. FIGS. 9a and 9b show the sub-image of the numeral string '24060' segmented by the vertical segmentation line, and FIG. 9c shows the sub-image of the numeral string segmented by the non-vertical segmentation line.

Referring to FIGS. 9a and 9c, the present invention proposes a method of segmenting the handwritten touching numeral string having any inclination by use of the searched non-vertical line. In particular, the candidate segmentation points are determined as the locally minimum and maximum segmentation points shown in the higher and lower regions on the contour line of the touching numeral string. The valley and mountain regions are determined as the candidate segmentation region, and then the touching numeral string is segmented for the candidate segmentation points only existed in the segmentation region, so as to reduce an error in the segmentation of the touching numeral string. In addition, in order to prevent the loss of numeral stroke due to the vertical segmentation of the touching numeral string having any inclination, the non-vertical segmentation line consisting of the pair of locally minimum and maximum segmentation points are searched to segment the touching numeral string.

With the method described above, according to the method of segmenting the handwritten numeral string having the non-vertical segmentation line, since the non-vertical segmentation line is searched to segment the touching numeral string to correctly segment and recognize the handwritten touching numeral string having any inclination, there is no a problem of the error segmentation which occurs in case of segmenting the touching numeral string by use of the vertical segmentation line according to the conventional method of segmenting the touching numeral string.

In particular, the method of segmenting the handwritten numeral string having the non-vertical segmentation line according to the present invention searches the candidate segmentation points, i.e., the locally minimum and maximum segmentation points, in the candidate segmentation contour line region, and after eliminating the candidate segmentation points having the possibility of error segmentation, searches the pair of non-vertical segmentation points as the candidate segmentation point. Therefore, there is another advantage that the error segmentation provided by the conventional method of segmenting the touching numeral string due to the numeral stroke lost by the vertical segmentation line may be remarkable reduced.

In addition, the method of segmenting the handwritten numeral string having the non-vertical segmentation line according to the present invention may improve the recognizing rate of the touching numeral string by reducing the error recognizing rate due to the error segmentation at the touching numeral recognition, and segments and recognizes the indiscrete numeral in the touching numeral string independent upon whatever the neighboring numerals have any inclination. Since the recognizing rate for the touching numeral string which is a main cause of the error recognition at the recognition of the handwritten numeral string may be improved, there is an advantage that the present invention may be applied to an applied system under the environment which the writing condition is not restricted.

The forgoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of segmenting handwritten touching numeral strings having a non-vertical segmentation line, the method comprising the steps of:
   receiving an image of the handwritten touching numeral strings having the non-vertical segmentation line extracted from a specially patterned document;
   smoothing an uneven shape of the image of handwritten touching numeral strings;
   searching a contour line for the image of smoothed handwritten touching numeral strings;
   searching a candidate segmentation region, in which the touching numeral strings may exist, from the searched contour line;
   searching a candidate segmentation point within the candidate segmentation region;
   searching a vertical segmentation line for segmenting the handwritten touching, numeral strings from the candidate segmentation point;
   searching the non-vertical segmentation line for segmenting the handwritten touching numeral strings having any inclination from the candidate segmentation lines; and
   segmenting the handwritten touching numeral strings by use of the vertical and non-vertical segmentation lines.

2. The segmentation method as claimed in claim 1, wherein in the step of searching the candidate segmentation region, a valley region to search a locally minimum candidate segmentation point and a mountain region to search a locally maximum candidate segmentation point are searched.

3. The segmentation method as claimed in claim 2, wherein in the step of searching the candidate segmentation region, in which the touching numeral strings may exist, from the searched contour line, pixels having a maximum y-coordinate value on the same x-axis among pixels for the higher contour line are evaluated along the x-axis, and the valley region capable of segmenting the handwritten touching numeral string is seared as the candidate segmentation region for remaining pixels which are made by removing pixels, which are firstly met when an x-coordinate value is increased relative to y-axis and when the x-coordinate value is decreased, among the evaluated y-coordinate values.

4. The segmentation method as claimed in claim 2, wherein in the step of searching the candidate segmentation region, in which the touching numeral strings may exist, from the searched contour line, pixels having a maximum y-coordinate value on the same x-axis among pixels for the higher contour line are evaluated along the x-axis, and the mountain region capable of segmenting the handwritten touching numeral string is seared as the candidate segmentation region for remaining pixels which are made by removing pixels, which are firstly met when an x-coordinate value is increased relative to y-axis and when the x-coordinate value is decreased, among the evaluated y-coordinate values.

5. The segmentation method as claimed in claim 1, wherein in the step of searching the candidate segmentation point within the candidate segmentation region, only candidate segmentation points existed in the searched candidate segmentation region are searched.

6. The segmentation method as claimed in claim 1, wherein in the step of searching the candidate segmentation point within the candidate segmentation region, the locally minimum candidate segmentation point and the locally maximum candidate segmentation point existed in the searched candidate segmentation region are searched.

7. The segmentation method as claimed in claim 2, wherein in the step of searching the candidate segmentation point within the candidate segmentation region, the locally minimum candidate segmentation point and the locally maximum candidate segmentation point existed in the searched candidate segmentation region are searched.

8. The segmentation method as claimed in claim 3, wherein in the step of searching the candidate segmentation point within the candidate segmentation region, the locally minimum candidate segmentation point and the locally maximum candidate segmentation point existed in the searched candidate segmentation region are searched.

9. The segmentation method as claimed in claim 4, wherein in the step of searching the candidate segmentation point within the candidate segmentation region, the locally minimum candidate segmentation point and the locally maximum candidate segmentation point existed in the searched candidate segmentation region are searched.

10. The segmentation method as claimed in claim 5, wherein in the step of searching the candidate segmentation point within the candidate segmentation region, the locally minimum candidate segmentation point and the locally maximum candidate segmentation point existed in the searched candidate segmentation region are searched.

11. The segmentation method as claimed in claim 6, wherein in the step of searching the vertical segmentation line, the vertical segmentation line is searched, in which the locally minimum candidate segmentation point existed in the valley region is regarded as an enter point and the y-coordinate for a lower contour line having the same x-coordinate as the locally minimum candidate segmentation point is regarded as an exit point, and the vertical segmentation line is searched in which the locally maximum candidate segmentation vertical segmentation line is searched in which the locally maximum candidate segmentation point existed in the mountain region is regarded as the exit point and the y-coordinate for a higher contour line having the same x-coordinate as the locally maximum candidate segmentation point is regarded as the enter point.

12. The segmentation method as claimed in claim 6, wherein in the step of searching the non-vertical segmentation line, a pair of non-vertical candidate segmentation points are further searched from the locally minimum and maximum candidate segmentations, the non-vertical segmentation points satisfying a proper condition of the non-vertical candidate segmentation line, in which the locally minimum candidate segmentation point is regarded as an enter point and the locally maximum candidate segmentation point is regarded as an enter point, and the non-vertical segmentation line is searched from the pair of non-vertical candidate segmentation points.

* * * * *